(12) United States Patent
Kadono et al.

(10) Patent No.: US 10,394,250 B2
(45) Date of Patent: Aug. 27, 2019

(54) WORK MACHINE MANAGEMENT APPARATUS

(71) Applicant: Komatsu Ltd., Tokyo (JP)

(72) Inventors: Yosuke Kadono, Tokyo (JP); Takashi Hiranaka, Tokyo (JP); Isao Toku, Tokyo (JP); Kenta Osagawa, Tokyo (JP); Takashi Yamamoto, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 15/322,197

(22) PCT Filed: Apr. 28, 2016

(86) PCT No.: PCT/JP2016/063512
§ 371 (c)(1),
(2) Date: Dec. 27, 2016

(87) PCT Pub. No.: WO2016/167375
PCT Pub. Date: Oct. 20, 2016

(65) Prior Publication Data
US 2017/0315561 A1    Nov. 2, 2017

(51) Int. Cl.
*B60P 1/04* (2006.01)
*E02F 3/32* (2006.01)
(Continued)

(52) U.S. Cl.
CPC .............. *G05D 1/0276* (2013.01); *B60P 1/04* (2013.01); *E02F 9/205* (2013.01); *E02F 9/2054* (2013.01);
(Continued)

(58) Field of Classification Search
CPC ....... G05D 1/0276; G05D 1/0287; B60P 1/04; E02F 3/32; E02F 9/2045
See application file for complete search history.

(56) References Cited

U.S. PATENT DOCUMENTS 6,668,157 B1 * 12/2003 Takeda .................. H04B 7/155
455/11.1
2006/0069472 A1    3/2006 Makela
(Continued)

FOREIGN PATENT DOCUMENTS

| CA | 2923683 A1 | 6/2015 |
|---|---|---|
| JP | 05-112239 A | 5/1993 |

(Continued)

OTHER PUBLICATIONS

Examination Report dated Jan. 23, 2017, issued for the corresponding Australian Patent Application No. 2016248873.
(Continued)

*Primary Examiner* — Behrang Badii
*Assistant Examiner* — Daniel L Greene
(74) *Attorney, Agent, or Firm* — Locke Lord LLP

(57) ABSTRACT

A work machine management apparatus includes: a switchback point setting unit configured to set at least one switchback point of a work machine in a work place of a mine; a work point setting unit configured to set a plurality of work points of the work machine; a travel track generating unit configured to generate, based on a position of each of the plurality of work points and a position of the at least one switchback point in a loading place, a plurality of target travel tracks along which the work machine travels in the work place; and a travel track selecting unit configured to select, among the plurality of target travel tracks, a target travel track along which the work machine travels in the work place.

17 Claims, 14 Drawing Sheets

(51) Int. Cl.
*E02F 9/20* (2006.01)
*E02F 9/26* (2006.01)
*G05D 1/02* (2006.01)

(52) U.S. Cl.
CPC ......... *G05D 1/0214* (2013.01); *G05D 1/0274* (2013.01); *E02F 3/32* (2013.01); *E02F 9/2045* (2013.01); *E02F 9/262* (2013.01); *G05D 2201/021* (2013.01)

(56) References Cited

U.S. PATENT DOCUMENTS

| | | | |
|---|---|---|---|
| 2007/0179690 A1 | 8/2007 | Stewart | |
| 2010/0075029 A1* | 3/2010 | Wilson, Jr. | C04B 28/04 427/138 |
| 2010/0076640 A1* | 3/2010 | Maekawa | G05D 1/0217 701/26 |
| 2012/0296495 A1 | 11/2012 | Ozaki et al. | |
| 2013/0054133 A1* | 2/2013 | Lewis | G01C 21/3407 701/423 |
| 2013/0211712 A1 | 8/2013 | Takeda | |
| 2013/0325208 A1 | 12/2013 | Osagawa et al. | |
| 2014/0266859 A1* | 9/2014 | Kurihara | G01S 13/86 342/70 |
| 2016/0224026 A1 | 8/2016 | Hamada et al. | |
| 2017/0102702 A1* | 4/2017 | Ishijima | A01B 69/008 |

FOREIGN PATENT DOCUMENTS

| | | |
|---|---|---|
| JP | 11-283176 A | 10/1999 |
| JP | 2007-310698 A | 11/2007 |
| JP | 2009-146327 A | 7/2009 |
| JP | 2009-525553 A | 7/2009 |
| JP | 2012-022611 A | 2/2012 |
| JP | 2012-113429 A | 6/2012 |
| JP | 2014-142831 A | 8/2014 |
| WO | 2011/090093 A1 | 7/2011 |
| WO | 2015/087430 A1 | 6/2015 |
| WO | 2016/051526 A1 | 4/2016 |

OTHER PUBLICATIONS

International Search Report dated Jul. 26, 2016, issued for PCT/JP2016/063512.

* cited by examiner

WORK MACHINE MANAGEMENT APPARATUS

FIELD

The present invention relates to a work machine management apparatus.

BACKGROUND

In a mine, there is a case in which a work machine operated without the help of a man is used. Patent Literature 1 discloses an example of an unmanned vehicle traveling system that causes an unmanned dump truck to travel.

CITATION LIST

Patent Literature

Patent Literature 1: WO 2011/090093 A

SUMMARY

Technical Problem

In the unmanned vehicle traveling system, the work machine travels in accordance with target travel track data representing a target travel track and sent from a management apparatus. A plurality of work machines travel along the same target travel track. For that reason, there is a high possibility that a rut is generated in a transportation track or a work place in a mine. When a deep rut is generated, the traveling of the work machine is disturbed. Therefore, when the deep rut is generated, for example, a ground leveling work using a grader is performed. During the ground leveling work, the traveling of the work machine is disturbed and hence the productivity of the mine is deteriorated. Further, the ground leveling work causes an increase in cost.

An aspect of the present invention is to provide a work machine management apparatus capable of suppressing deterioration in productivity in a mine by suppressing the generation of a rut.

Solution to Problem

According to an aspect of the present invention, a work machine management apparatus comprises: a switchback point setting unit configured to set at least one switchback point of a work machine in a work place of a mine; a work point setting unit configured to set a plurality of work points of the work machine; a travel track generating unit configured to generate, based on a position of each of the plurality of work points and a position of the at least one switchback point in a loading place, a plurality of target travel tracks along which the work machine travels in the work place; and a travel track selecting unit configured to select, among the plurality of target travel tracks, a target travel track along which the work machine travels in the work place.

Advantageous Effects of Invention

According to the aspect of the present invention, there is provided a work machine management apparatus capable of suppressing deterioration in productivity in a mine by suppressing the generation of a rut.

DESCRIPTION OF EMBODIMENTS

Hereinafter, embodiments according to the present invention will be described with reference to the drawings, but the present invention is not limited thereto.

First Embodiment

Figure 1:
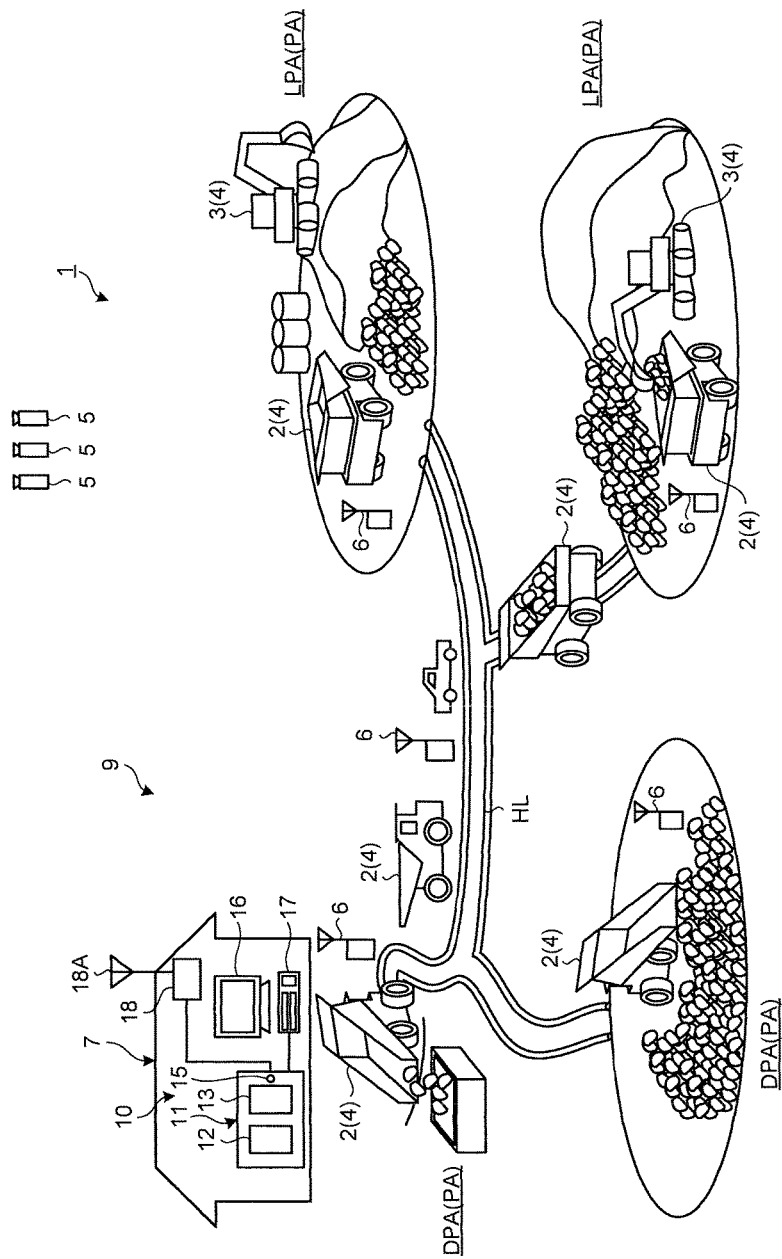
FIG. 1 is a diagram schematically illustrating an example of a work machine control system according to a first embodiment.

A first embodiment will be described. FIG. 1 is a diagram illustrating an example of a control system 1 of a work machine 4 according to the embodiment. In the embodiment, an example will be described in which the work machine 4 is a mining machine 4 operated in a mine.

The mining machine 4 generally indicates a machine which is used for various kinds of work in a mine. The mining machine 4 includes at least one of a transporting machine, a loading machine, an excavating machine, a boring machine, and a crushing machine. The transporting machine is a mining machine used to transport a load and includes a dump truck with a vessel. The loading machine is a mining machine used to load a load onto the transporting machine and includes at least one of an excavator, an electric excavator, and a wheel loader.

Further, the mining machine 4 includes an unmanned mining machine operated without the help of a man and a manned mining machine operated by the operation of an operator riding thereon.

In the embodiment, an example will be described in which a dump truck 2 as the transporting machine and an excavator 3 as the loading machine are operated as the mining machine 4.

In the embodiment, the dump truck 2 is an unmanned dump truck operated without the help of a man. The dump truck 2 travels autonomously in a mine based on data or signals sent from a management apparatus 10. The autonomous traveling of the dump truck 2 indicates the traveling based on the data or signals sent from the management apparatus 10 instead of the operation of the operator.

In the embodiment, the excavator 3 is a manned excavator which is operated by an operator riding thereon.

As illustrated in FIG. 1, a work place PA and a transportation track HL are provided in a mine. The work place PA includes at least one of a loading place LPA and a soil removing place DPA. The loading place LPA is an area in which a loading operation of loading a load onto the dump truck 2 is performed. The soil removing place DPA is an area in which a discharging operation of discharging a load from the dump truck 2 is performed. The transportation track HL is a travel track that leads to the work place PL. The dump truck 2 travels along at least part of the work place PA and the transportation track HL of the mine.

In FIG. 1, the control system 1 includes a communication system 9 and the management apparatus 10 provided in a mine control facility 7. The communication system 9 includes a plurality of relays 6 which relay data or signals. The communication system 9 sends and receives data or signals between the management apparatus 10 and the mining machine 4 based on radio communication. Further, the communication system 9 sends and receives data or signals among the plurality of mining machines 4 based on radio communication.

In the embodiment, the position of the mining machine 4 including the dump truck 2 and the excavator 3 is detected by a GNSS (Global Navigation Satellite System). The GNSS indicates a global navigation satellite system. As an example of the global navigation satellite system, a GPS (Global Positioning System) can be exemplified. The GNSS includes a plurality of positioning satellites 5. The GNSS detects a position specified by the coordinate data of latitude, longitude, and altitude. The position detected by the GNSS is an absolute position specified by a global coordinate system. By the use of the GNSS, the position of the dump truck 2 and the position of the excavator 3 in the mine are detected.

In the description below, the position detected by the GNSS will be appropriately referred to as a GPS position. The GPS position is an absolute position and includes coordinate data of latitude, longitude, and altitude.

Next, the management apparatus 10 will be described. The management apparatus 10 sends data or signals to the mining machine 4 and receives data or signals from the mining machine 4. As illustrated in FIG. 1, the management apparatus 10 includes a computer 11, a display device 16, an input device 17, and a radio communication device 18.

The computer 11 includes a processing device 12, a storage device 13 connected to the processing device 12, and an input/output unit 15. The display device 16, the input device 17, and the radio communication device 18 are connected to the computer 11 through the input/output unit 15.

The processing device 12 performs a calculation process for managing the mining machine 4. The processing device 12 includes a processor such as a CPU (Central Processing Unit). The storage device 13 stores data for managing the mining machine 4. The storage device 13 includes non-volatile memory such as ROM (Read Only Memory) or flash memory and volatile memory such as RAM (Random Access Memory). The display device 16 displays the result of a calculation process of the processing device 12. The display device 16 includes a flat panel display such as a liquid crystal display (LCD) or an organic electro luminescence display (OELD). The input device 17 generates data for managing the mining machine 4 through an operation. The input device 17 includes at least one of, for example, a keyboard, a mouse, and a touch panel for a computer. The processing device 12 performs a calculation process by the use of at least one of data stored in the storage device 13, data generated by the input device 17, and data acquired through the communication system 9.

The radio communication device 18 is provided in the control facility 7. The radio communication device 18 includes an antenna 18A. The radio communication device 18 is connected to the processing device 12 through the input/output unit 15. The communication system 9 includes the radio communication device 18. The radio communication device 18 can receive data or signals sent from the mining machine 4. The data or signals received by the radio communication device 18 are output to the processing device 12 and are stored in the storage device 13. The radio communication device 18 can send data or signals to the mining machine 4.

Figure 2:
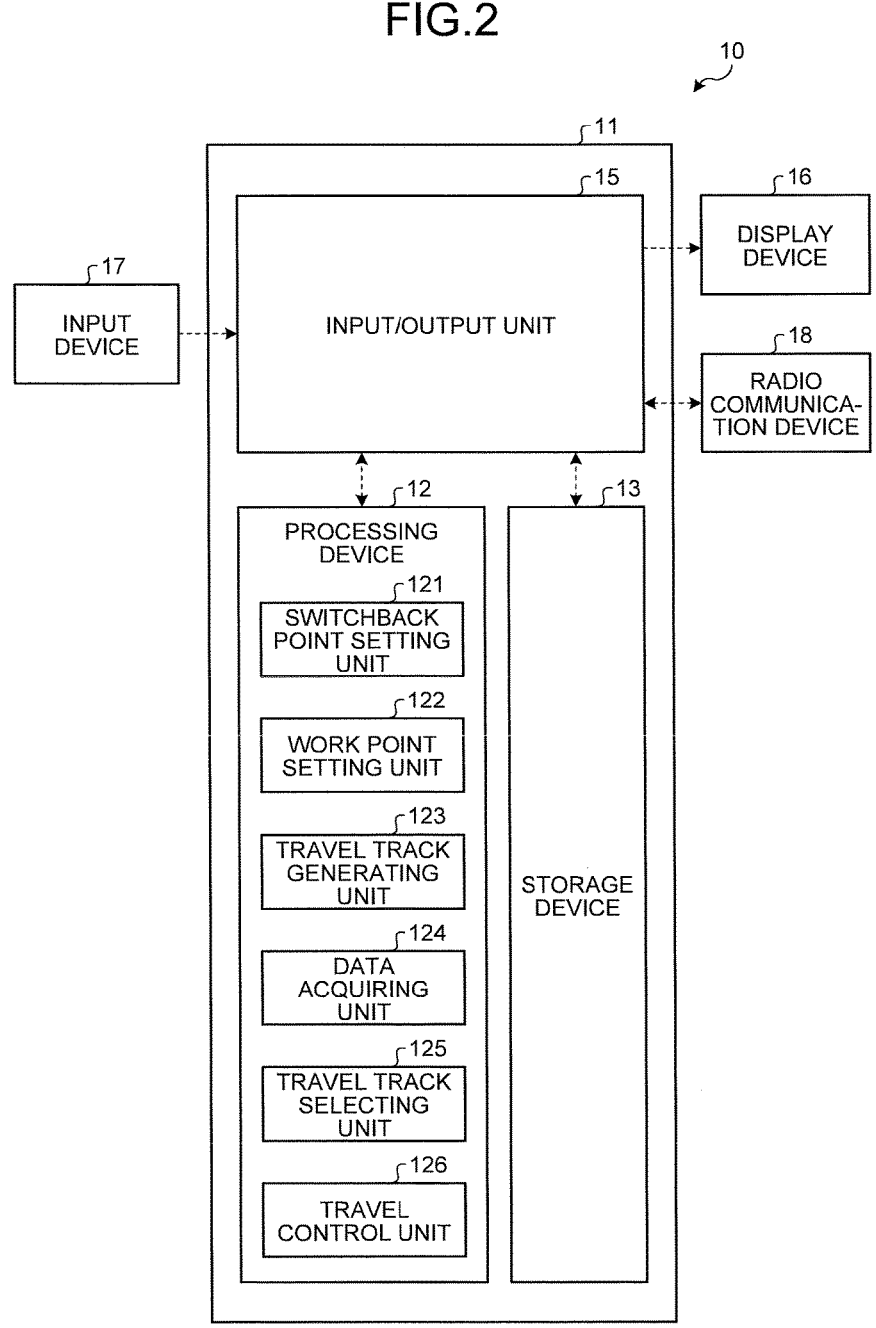
FIG. 2 is a functional block diagram illustrating an example of a management apparatus according to the first embodiment.

FIG. 2 is a functional block diagram illustrating an example of the management apparatus 10 according to the embodiment. As illustrated in FIG. 2, the processing device 12 of the management apparatus 10 includes a switchback point setting unit 121 which sets a switchback point of the dump truck 2 in the work place PA of the mine, a work point setting unit 122 which sets a work point of the dump truck 2 in the work place PA of the mine, a travel track generating unit 123 which generates a plurality of target travel tracks of the mining machine 4, a data acquiring unit 124 which acquires data or signals sent from the mining machine 4, a travel track selecting unit 125 which selects a target travel track for the dump truck 2 among the plurality of target travel tracks generated by the travel track generating unit 123, and a travel control unit 126 which outputs a control signal so that the dump truck 2 travels along the target travel track selected by the travel track selecting unit 125.

The switchback point setting unit 121 sets at least one switchback point indicating the absolute position in which the dump truck 2 is switched back in at least one of the loading place LPA and the soil removing place DPA. The switching back indicates an operation in which the forward moving dump truck 2 changes the traveling direction at a sharp angle and approaches a work point while moving backward.

The work point setting unit 122 sets a work point representing an absolute position in which the dump truck 2 performs a specific work in at least one of the loading place LPA and the soil removing place DPA. The specific work of the dump truck 2 includes at least one of a loading operation of loading a load onto the dump truck 2 and a discharging operation of discharging a load from the dump truck 2. The work point includes at least one of a loading point representing an absolute position in which a loading operation is performed and a discharging point representing an absolute position in which a discharging operation is performed. The loading point is set in the loading place LPA. The discharging point is set in the soil removing place DPA.

The travel track generating unit 123 generates a target travel track for each dump truck 2 traveling in at least one of the transportation track HL and the work place PA of the mine. The travel track generating unit 123 generates a plurality of target travel tracks along which the dump truck 2 travels in the work place based on the position of each of the plurality of work points and the position of at least one switchback point in the work place including at least one of the transportation track HL and the work place PA.

The data acquiring unit 124 acquires data or signals sent from the mining machine 4 including the dump truck 2 and the excavator 3.

The travel track selecting unit 125 selects a target travel track along which the dump truck 2 travels in the work place among the plurality of target travel tracks generated by the travel track generating unit 123. Further, when a plurality of work points are set, the travel track selecting unit 125 selects the target travel track so that the dump truck 2 sequentially travels through the plurality of work points.

The travel control unit 126 generates a control signal for controlling the traveling of the dump truck 2 and outputs the control signal. The travel control unit 126 controls the dump truck 2 so that the dump truck 2 travels along the target travel track generated by the travel track generating unit 123.

Figure 3:
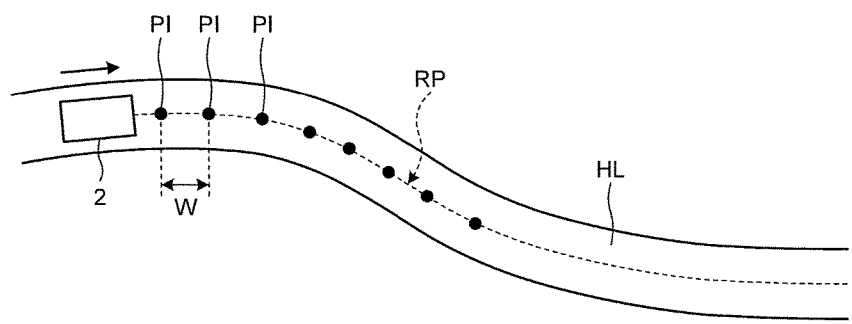
FIG. 3 is a schematic diagram illustrating an example of a target travel track according to the first embodiment.

FIG. 3 is a schematic diagram illustrating an example of a target travel track RP according to the embodiment. The travel track generating unit 123 of the processing device 12 generates the traveling condition data of the dump truck 2 traveling in the mine. The traveling condition data of the target travel track RP includes an assembly of a plurality of course points PI set on the target travel track RP at the same interval W.

Each of the plurality of course points PI includes target absolute position data of the dump truck 2 and target travel speed data of the dump truck 2 at a position in which the course point PI is set. The target travel track RP is specified by the target travel track RP as the assembly of the plurality of course points PI. The target travel track RP of the dump truck 2 is specified by a track passing through the plurality of course points PI. Based on the target travel speed data, a target travel speed of the dump truck 2 at a position in which the course point PI is set is specified.

The management apparatus 10 outputs traveling condition data including the plurality of front course points PI in the traveling direction to the dump truck 2 through the radio communication device 18. The dump truck 2 travels in the mine in accordance with the traveling condition data sent from the management apparatus 10.

Additionally, FIG. 3 illustrates the target travel track RP set in the transportation track HL. The travel track generating unit 123 generates the target travel track RP representing the target travel track RP not only in the transportation track HL, but also in the work place PA.

Figure 4:
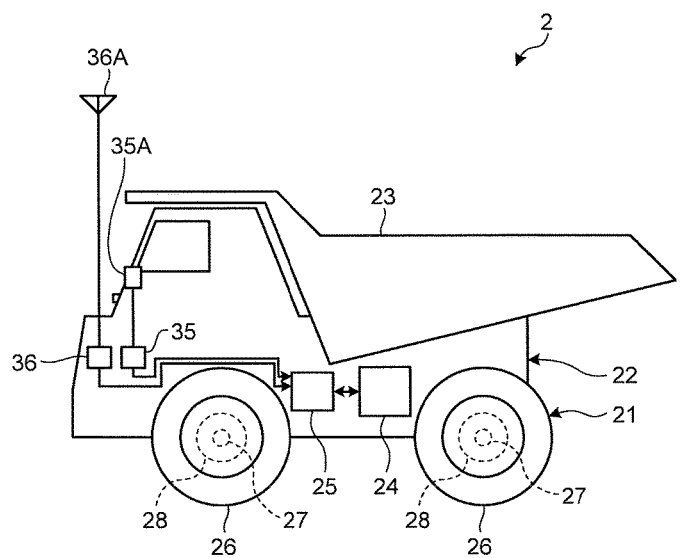
FIG. 4 is a diagram schematically illustrating an example of a dump truck according to the first embodiment.

Next, the dump truck 2 according to the embodiment will be described. FIG. 4 is a diagram schematically illustrating an example of the dump truck 2 according to the embodiment.

The dump truck 2 includes a traveling device 21 which travels in the mine, a vehicle body 22 which is supported by the traveling device 21, a vessel 23 which is supported by the vehicle body 22, a driving device 24 which drives the traveling device 21, and a control device 25.

The traveling device 21 includes a vehicle wheel 26, an axle 27 which rotatably supports the vehicle wheel 26, a brake device 28 which brakes the traveling device 21, and a steering device 29 which can adjust a traveling direction.

The traveling device 21 is operated by driving power generated by the driving device 24. The driving device 24 generates driving power for accelerating the dump truck 2. The driving device 24 drives the traveling device 21 by, for example, an electric driving method. The driving device 24 includes an internal combustion engine such as a diesel engine, a generator generated by power of the internal combustion engine, and a motor operated by electric power generated by the generator.

The steering device 29 adjusts the advancing direction of the dump truck 2 by changing the direction of the vehicle wheel 26.

The brake device 28 generates a braking force for decelerating or stopping the dump truck 2. The control device 25 outputs an accelerator instruction signal for operating the driving device 24, a brake instruction signal for operating the brake device 28, and a steering instruction signal for operating the steering device 29.

Further, the dump truck 2 includes a position detector 35 which detects the position of the dump truck 2 and a radio communication device 36.

The position detector 35 includes a GPS receiver and detects the GPS position (coordinate) of the dump truck 2. The position detector 35 includes a GPS antenna 35A. The antenna 35A receives radio waves from the positioning satellite 5. The position detector 35 converts signals based on the radio waves sent from the positioning satellite 5 and received by the antenna 35A into electric signals and calculates the position of the antenna 35A. When the GPS position of the antenna 35A is calculated, the GPS position of the dump truck 2 is detected.

The communication system 9 includes the radio communication device 36 provided in the dump truck 2. The radio communication device 36 includes an antenna 36A. The radio communication device 36 can perform radio communication with respect to the management apparatus 10.

The management apparatus 10 sends the traveling condition data of the dump truck 2 including the target travel track RP to the control device 25 through the communication system 9. The control device 25 controls at least one of the dump truck 2 the driving device 24, the brake device 28, and the steering device 29 so that the dump truck 2 travels in accordance with the traveling condition data based on the traveling condition data supplied from the management apparatus 10.

Further, the dump truck 2 sends absolute position data representing the absolute position of the dump truck 2 detected by the position detector 35 to the management apparatus 10 through the communication system 9. The data acquiring unit 124 of the management apparatus 10 acquires the absolute position data of the plurality of dump trucks 2 traveling in the mine.

Figure 5:
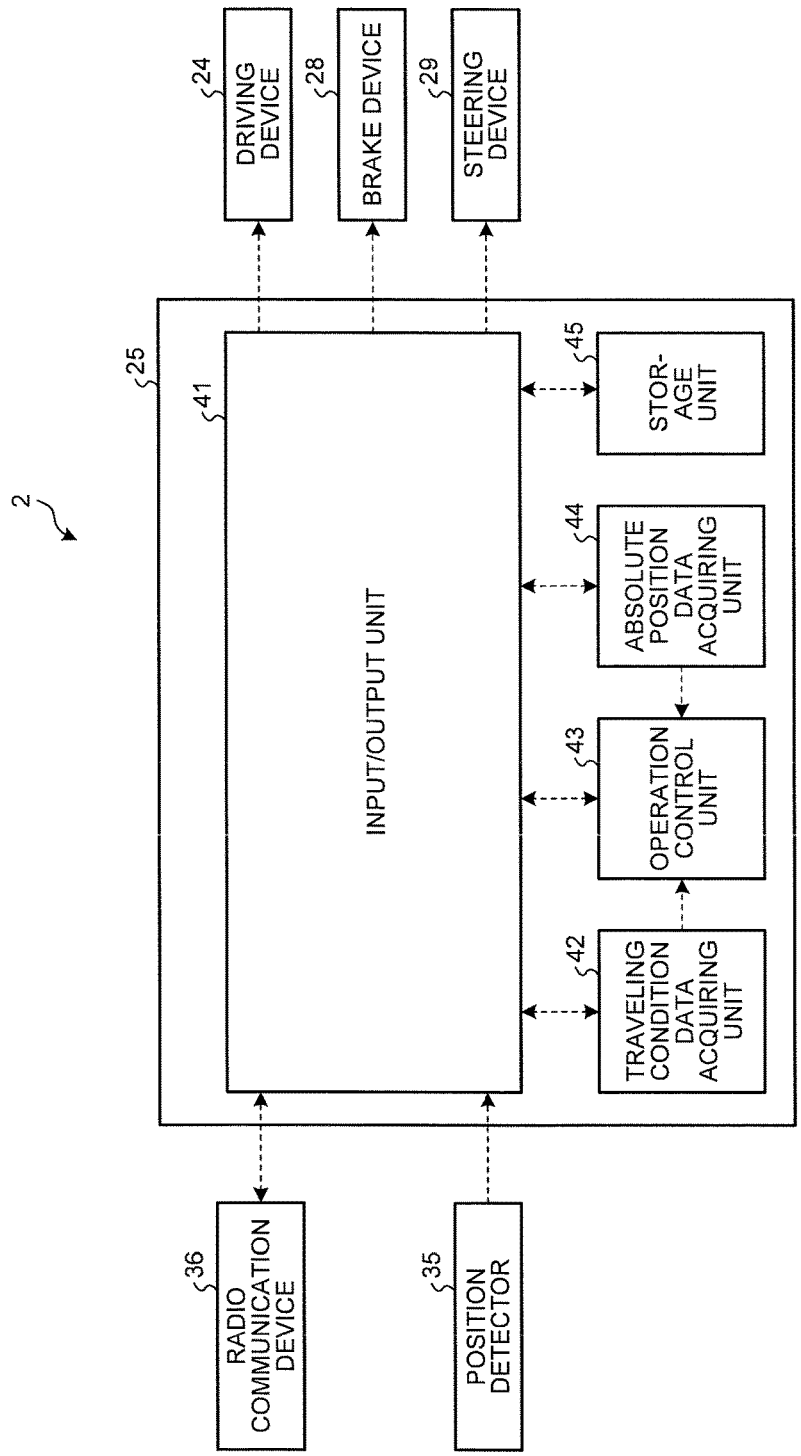
FIG. 5 is a functional block diagram illustrating an example of a dump truck control device according to the first embodiment.

Next, the control device 25 of the dump truck 2 according to the embodiment will be described. FIG. 5 is a functional block diagram of the control device 25 of the dump truck 2 according to the embodiment. The control device 25 is mounted on the dump truck 2.

As illustrated in FIG. 5, the dump truck 2 includes the radio communication device 36, the position detector 35, the control device 25, the driving device 24, the brake device 28, and the steering device 29.

The control device 25 includes an input/output unit 41, a traveling condition data acquiring unit 42, an operation control unit 43, an absolute position data acquiring unit 44, and a storage unit 45.

The input/output unit 41 acquires the traveling condition data output from the management apparatus 10 through the radio communication device 36 and the absolute position data representing the absolute position of the dump truck 2 through the position detector 35. Further, the input/output unit 41 outputs an accelerator instruction signal to the driving device 24, outputs a brake instruction signal to the brake device 28, and outputs a steering instruction signal to the steering device 29.

The traveling condition data acquiring unit 42 acquires the traveling condition data including the target travel track RP and sent from the management apparatus 10.

The operation control unit 43 outputs an operation control signal of controlling the traveling device 21 of the dump truck 2 based on the specified traveling condition data. The traveling device 21 includes the brake device 28 and the steering device 29. The operation control unit 43 outputs an operation control signal to the traveling device 21 including the driving device 24, the brake device 28, and the steering device 29. The operation control signal includes an accelerator signal output to the driving device 24, a brake instruction signal output to the brake device 28, and a steering instruction signal output to the steering device 29.

The absolute position data acquiring unit 45 acquires the absolute position data of the dump truck 2 from the detection result of the position detector 35.

The storage unit 45 stores the traveling condition data of the dump truck 2 acquired from the radio communication device 36. The traveling condition data includes the target travel track RP representing the target travel track RP.

Figure 6:
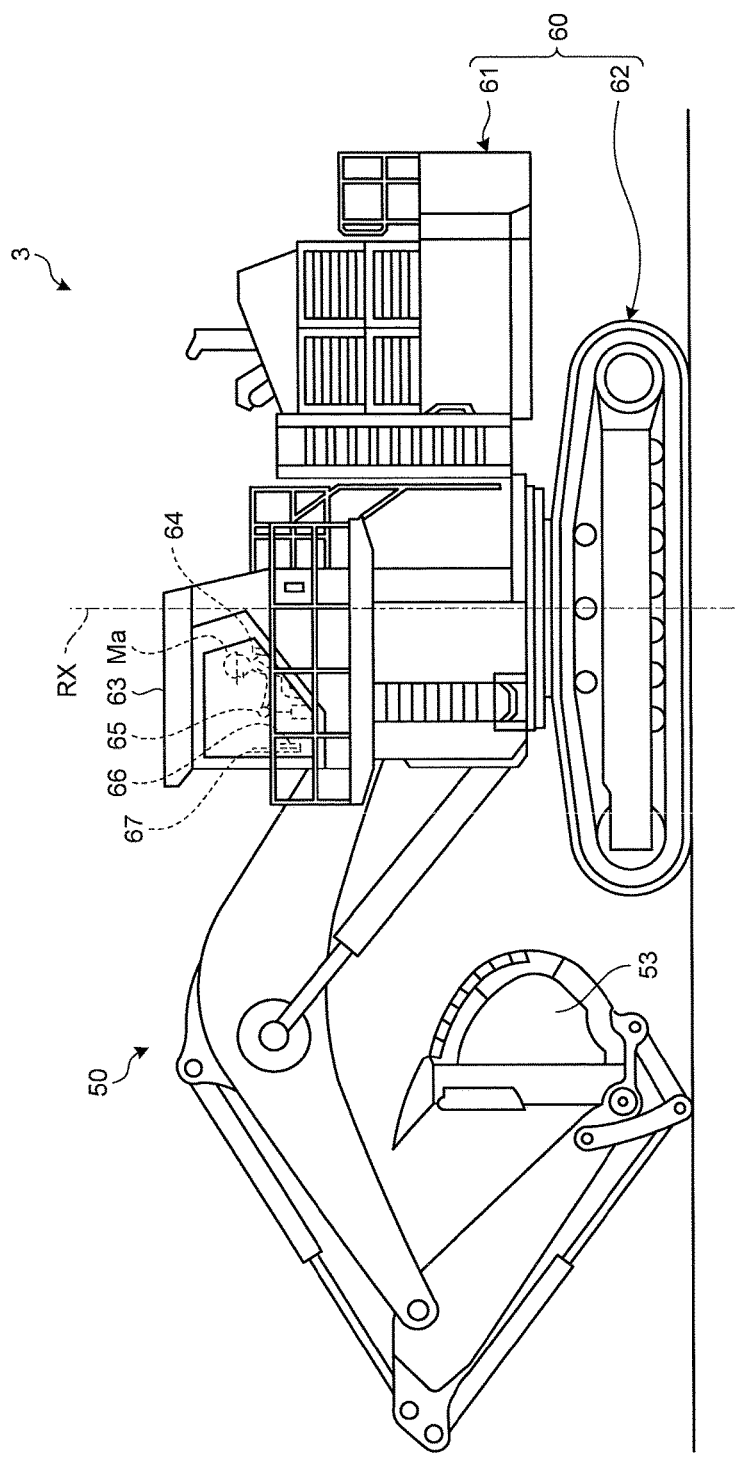
FIG. 6 is a diagram schematically illustrating an example of an excavator according to the first embodiment.
Figure 7:
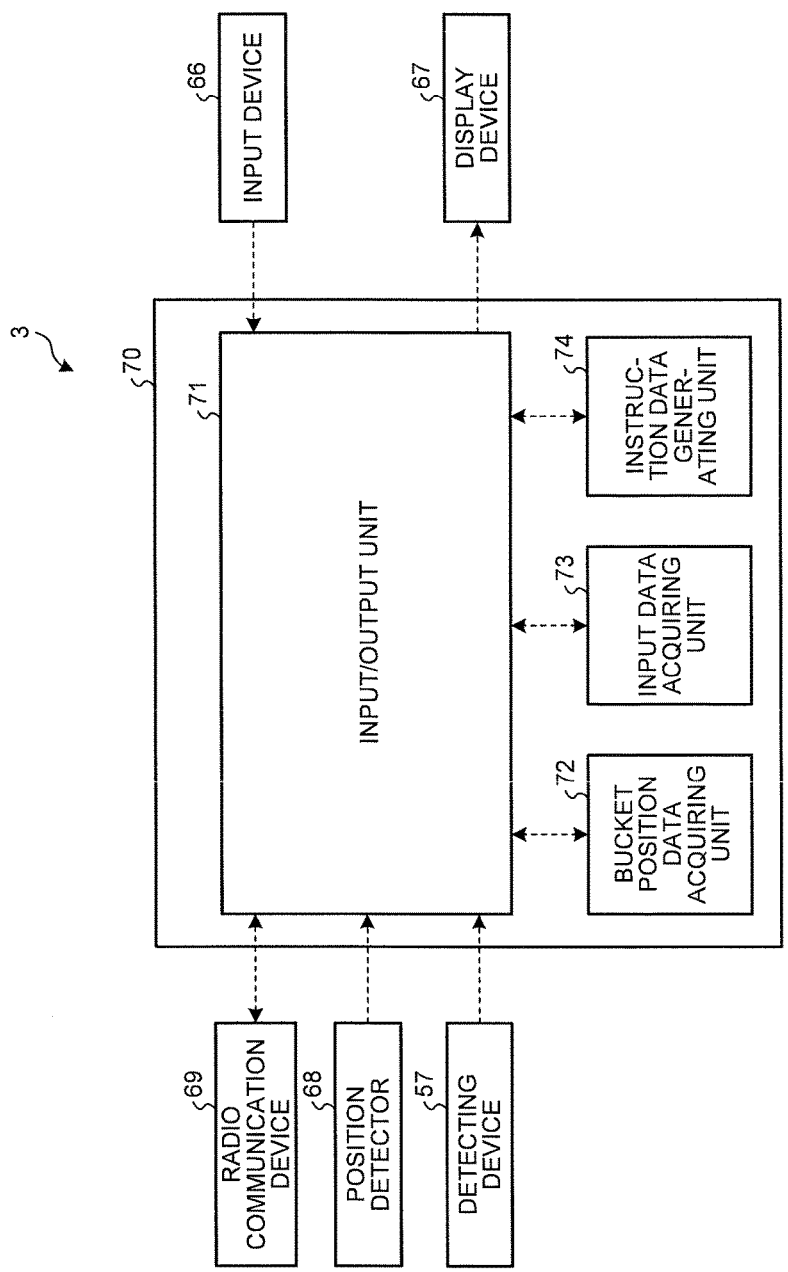
FIG. 7 is a functional block diagram illustrating an example of an excavator control device according to the first embodiment.

Next, the excavator 3 according to the embodiment will be described. FIG. 6 is a diagram schematically illustrating an example of the excavator 3 according to the embodiment. FIG. 7 is a functional block diagram of a control device 70 of the excavator 3 according to the embodiment. The control device 70 is mounted on the excavator 3.

As illustrated in FIG. 6, the excavator 3 includes a working implement 50 which is operated by a hydraulic pressure and a vehicle body 60 which supports the working implement 50. The vehicle body 60 includes an upper swing body 61 and a lower travel body 62 which supports the upper swing body 61. The upper swing body 61 includes a cab 63 with an operation room. A driver seat 64 on which an operator Ma sits, an operation lever 65 which is operated by the operator Ma, an input device 66 which is operated by the operator Ma, and a display device 67 are disposed in the operation room.

As illustrated in FIG. 7, the excavator 3 includes a detecting device 57 which detects the relative position of a bucket 53 with respect to the upper swing body 61. Further, the excavator 3 includes a position detector 68 which detects the absolute position of the upper swing body 61 and a radio communication device 69.

The position detector 68 includes a GPS receiver and an inertial measurement unit (IMU) and detects the GPS position (absolute position) and the direction of the upper swing body 61 in the excavator 3. The relative position of a blade edge 53B of the bucket 53 with respect to the upper swing body 61 is detected by the detecting device 57. The relative position of the bucket may be specified to be located at a point separated from a swing center by a predetermined distance in the direction of the upper swing body 61 and may be specified by the detection of the angles of a boom, an arm, and the bucket. The absolute position of the blade edge 53B of the bucket 53 is calculated based on the detection result of the position detector 68 and the detection result of the detecting device 57.

The communication system 9 includes the radio communication device 69 provided in the excavator 3. The radio communication device 69 can perform radio communication with respect to the management apparatus 10.

Figure 9:
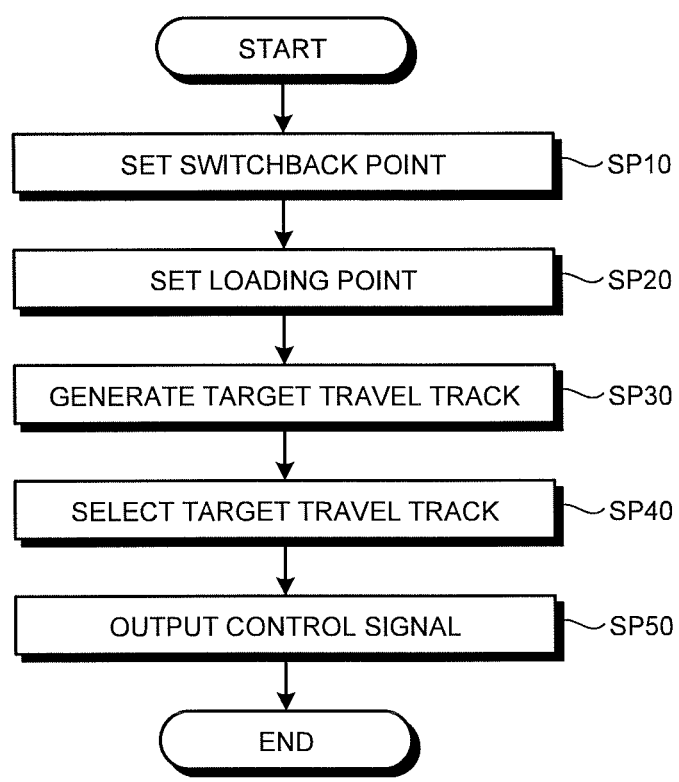
FIG. 9 is a flowchart illustrating an example of a dump truck control method according to the first embodiment.

Next, the control device of the excavator 3 according to the embodiment will be described. FIG. 9 is a functional block diagram of the control device 70 of the excavator 3 according to the embodiment. The control device 70 is mounted on the excavator 3.

As illustrated in FIG. 9, the excavator 3 includes the radio communication device 69, the position detector 68, the detecting device 57, the control device 70, the input device 66, and the display device 67.

The control device 70 includes an input/output unit 71, a bucket position data acquiring unit 72, an input data acquiring unit 73, and an instruction data generating unit 74.

The input/output unit 71 acquires position data representing the position of the excavator 3 and output from the position detector 68, bucket position data representing the position of the bucket 53 and detected by the detecting device 57, and input data generated by the operation of the input device 66. Further, the input/output unit 41 outputs instruction data generated by the instruction data generating unit 74 to the management apparatus 10 through the radio communication device 69.

The bucket position data acquiring unit 72 acquires position data representing the absolute position of the upper swing body 61 detected by the position detector 68 and position data representing the relative position of the bucket 53 with respect to the upper swing body 61 detected by the detecting device 57. The bucket position data acquiring unit 72 calculates bucket position data representing the absolute position of the bucket 53 based on position data representing the absolute position of the upper swing body 61 detected by the position detector 68 and position data representing the relative position of the bucket 53 with respect to the upper swing body 61 detected by the detecting device 57.

The input data acquiring unit 73 acquires input data generated by the input device 66 through the operation of the operator Ma.

The instruction data generating unit 74 generates instruction data of instructing the setting of the work point of the mining machine 4. In the embodiment, the instruction data generating unit 74 generates instruction data of instructing the setting of the loading point of the dump truck 2 in the loading place LPA of the mine. As a method of setting the loading point, for example, the operator Ma operates the input device 66 while disposing the bucket 53 at a desired position through the operation of the operation lever 65. The instruction data includes bucket position data representing the absolute position of the bucket 53 at a time point in which the input device 66 is operated. The bucket position data of the bucket 53 at a time point in which input data generated by the input device 66 through the operation of the input device 66 is acquired by the input data acquiring unit 73 is set as a loading point. In this way, in the embodiment, when the input device 66 provided in the excavator 3 is operated, the instruction data of instructing the setting of the loading point is generated by the instruction data generating unit 74. The instruction data generated by the instruction data generating unit 74 is sent to the management apparatus 10 through the radio communication device 69.

Figure 8:
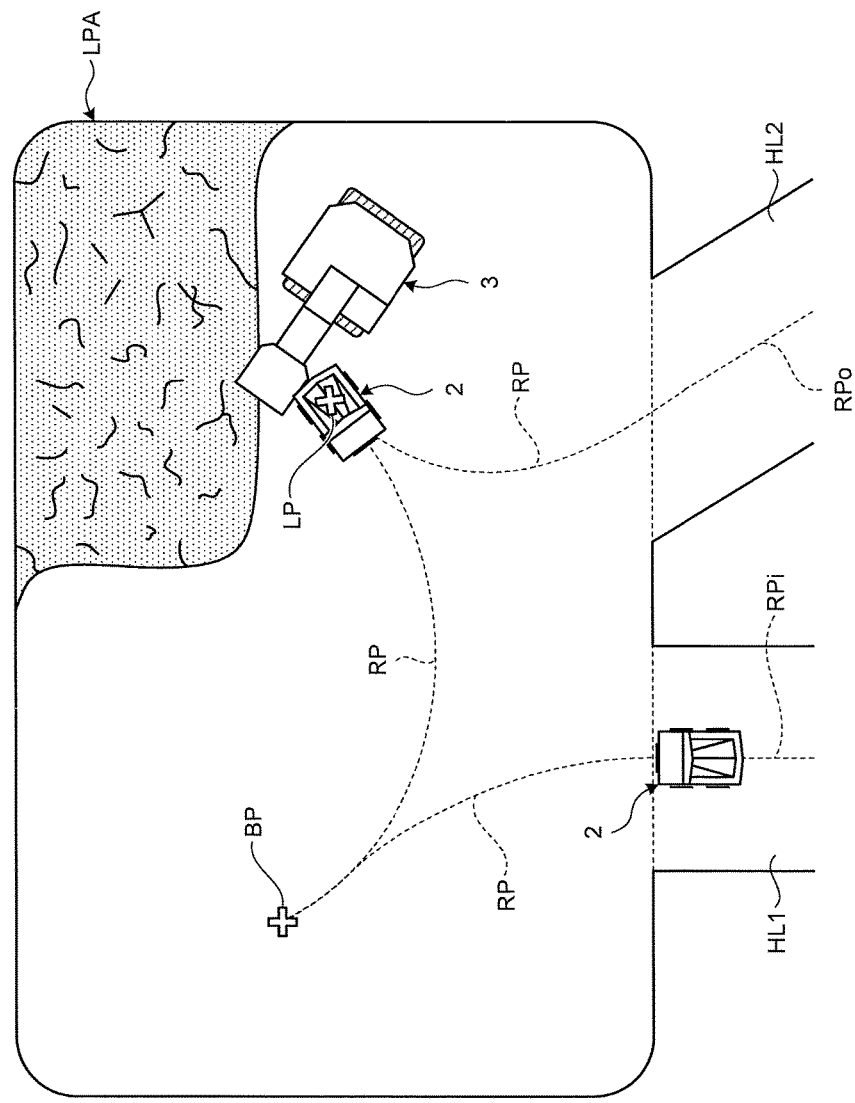
FIG. 8 is a schematic diagram illustrating an example of an operation of the dump truck according to the first embodiment.

Next, an example of an operation of the dump truck 2 according to the embodiment will be described. FIG. 8 is a schematic diagram illustrating an example of an operation of the dump truck 2 according to the embodiment in the loading place LPA.

The loading place LPA is an area in which the loading operation for the dump truck 2 is performed. The excavator 3 is disposed in the loading place LPA. A first transportation track HL1 in which the dump truck 2 entering and leaving from the loading place LPA travels and a second transportation track HL2 in which the dump truck 2 leaving from the loading place LPA travels are connected to the loading place LPA. Further, the transportation track may have a configuration in which only one transportation track HL is connected to the loading place LPA.

The travel track generating unit 123 of the management apparatus 10 generates a target travel track RPi of the dump truck 2 in the first transportation track HL1, a target travel track RPo of the dump truck 2 in the second transportation track HL2, and the target travel track RP of the dump truck 2 in the loading place LPA.

The switchback point setting unit 121 of the management apparatus 10 sets the switchback point BP in the loading place LPA. The work point setting unit 122 sets the loading point LP in the loading place LPA. The switchback point BP indicates a target point for the absolute position of the dump truck 2 to be switched back. The loading point LP indicates a target point for the absolute position of the dump truck 2 when the excavator 3 performs a loading operation. The dump truck 2 which enters the loading place LPA from the first transportation track HL1 while moving forward is switched back at the switchback point BP and moves to the loading point LP while moving backward. The dump truck 2 which performs a loading operation in the loading point LP leaves from the loading place LPA to the second transportation track HL2 while moving forward.

In the embodiment, the loading point LP is specified by, for example, the operator Ma of the excavator 3. The operator Ma operates the operation lever 65 so that the bucket 53 of the working implement 50 is disposed at a desired position. While the bucket 53 is disposed at a desired position, the operator Ma operates the input device 66. Bucket position data representing the absolute position of the bucket 53 at a time point in which input data generated by the input device 66 through the operation of the input device 66 is acquired by the input data acquiring unit 73 is set in the loading point LP.

Instruction data including the position data of the loading point LP set by the operator Ma is generated by the instruction data generating unit 74 of the excavator 3. The instruction data generated by the instruction data generating unit 74 is sent to the management apparatus 10 through the radio communication device 69.

The data acquiring unit 124 of the management apparatus 10 acquires instruction data including the position data of the loading point LP specified by the operator Ma from the excavator 3. The work point setting unit 122 of the management apparatus 10 sets the loading point LP based on the instruction data sent from the excavator 3. Additionally, the work point setting unit 122 may be configured so that the work point setting unit 122 automatically sets the loading point LP regardless of instruction data.

The travel track generating unit 123 generates the target travel track RP from the entrance of the loading place LPA so that the target travel track RPi of the first transportation track HL1 is connected to the switchback point BP set by the switchback point setting unit 121. Further, the travel track generating unit 123 generates the target travel track RP so that the switchback point BP set by the switchback point setting unit 121 is connected to the loading point LP set by the work point setting unit 122. Further, the travel track generating unit 123 generates the target travel track RP to the exit of the loading place LPA so that the loading point LP set by the work point setting unit 122 is connected to the target travel track RPo of the second transportation track HL2.

Target travel track data generated by the travel track generating unit 123, switchback point data set by the switchback point setting unit 121, and loading point data (work point data) set by the work point setting unit 122 are sent to the dump truck 2 through the communication system 9. In the embodiment, the target travel track data generated by the travel track generating unit 123 and selected by the travel track selecting unit 125 is sent to the dump truck 2 through the communication system 9. The dump truck 2 travels along the first transportation track HL1, the loading place LPA, and the second transportation track HL2 in accordance with the target travel track RPi of the first transportation track HL1, the target travel track RP including the switchback point BP and the loading point LP of the loading place LPA, and the target travel track RPo of the second transportation track HL2 generated by the management apparatus 10.

Figure 10:
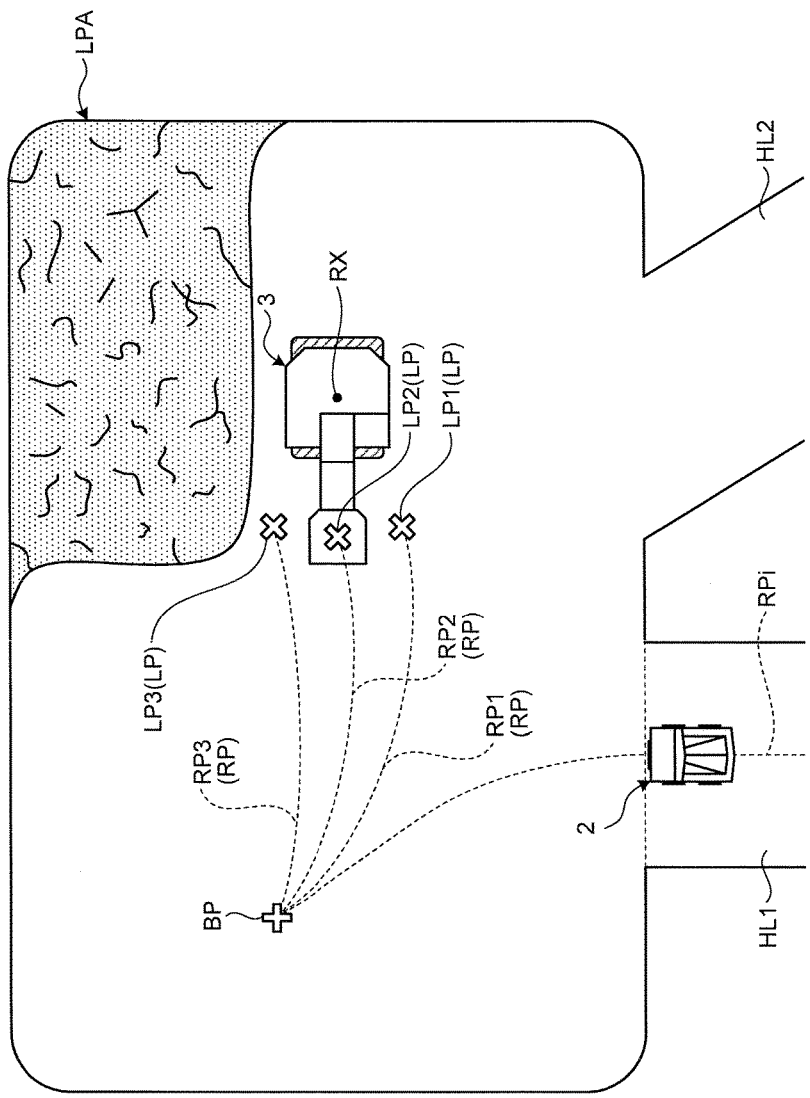
FIG. 10 is a schematic diagram illustrating an example of the dump truck control method according to the first embodiment.

Next, a method of controlling the dump truck 2 according to the embodiment will be described. FIG. 9 is a flowchart illustrating an example of a method of controlling the dump truck 2 according to the embodiment. FIG. 10 is a schematic diagram illustrating an example of a method of controlling the dump truck 2 according to the embodiment.

The position of the switchback point BP is set by the switchback point setting unit 121 of the management apparatus 10 (step SP10). The switchback point setting unit 121 sets the switchback point BP of the dump truck 2 in the loading place LPA. As illustrated in FIG. 10, in the embodiment, one switchback point BP is set. In the embodiment, the switchback point BP is set between the entrance of the loading place LPA and the position of the excavator 3. The entrance of the loading place LPA includes a connection portion between the first transportation track HL1 and the loading place LPA.

The setting of the position of the switchback point BP may be performed by, for example, a manager of the control facility 7 or may be performed by the operator Ma of the excavator 3. For example, the manager of the control facility 7 may set the switchback point BP by operating the input device 17. Further, a plurality of points may be automatically set by the switchback point setting unit 121 of the management apparatus 10. The operator Ma of the excavator 3 may set the switchback point BP by operating the input device 66. When the operator Ma of the excavator 3 sets the switchback point BP, the input data for setting the switchback point BP generated by the operation of the input device 66 is sent from the excavator 3 to the management apparatus 10 through the communication system 9.

In the embodiment, the work point setting unit 122 sets the loading point LP of the dump truck 2 at a plurality of positions in the loading place LPA (step SP20). As illustrated in FIG. 10, in the embodiment, for example, three loading points LP1, LP2, and LP3 are set at intervals.

After the positions of the plurality of loading points LP are set, the target travel track RP is generated (step SP30). As illustrated in FIG. 10, the travel track generating unit 123 generates the target travel track RPi so that the target travel track RPi in the first transportation track HL1 is connected to the switchback point BP of the loading place LPA.

Further, the travel track generating unit 123 generates the plurality of target travel tracks RP so that the switchback point BP is connected to each of the plurality of loading points LP (LP1, LP2, and LP3). In the example illustrated in FIG. 10, the plurality of target travel tracks RP includes a target travel track RP1 connecting the switchback point BP to the work point LP1, a target travel track RP2 connecting the switchback point BP to the work point LP2, and a target travel track RP3 connecting the switchback point BP to the work point LP3.

The travel track selecting unit 125 selects the target travel track RP along which the dump truck 2 travels from the plurality of target travel tracks RP (RP1, RP2, and RP3) generated by the travel track generating unit 123 (step SP40).

The target travel track RP generated by the travel track generating unit 123 and selected by the travel track selecting unit 125 is sent to each of the plurality of dump trucks 2 operated in the mine. Each of the plurality of dump trucks 2 travels within the loading place LPA along any target travel track RP selected by the travel track selecting unit 125.

The travel control unit 126 outputs a control signal for controlling the traveling of the dump truck 2 entering the loading place LPA from the first transportation track HL1 (step SP50). In the embodiment, the travel control unit 126 outputs a control signal to the dump truck 2 so that the dump truck 2 entering the loading place LPA travels along the target travel track RP selected by the travel track selecting unit 125.

When the travel track selecting unit 125 selects the target travel track RP in which the dump truck 2 travels from the plurality of target travel tracks RP (RP1, RP2, and RP3) set in the loading place LPA, the travel control unit 126 outputs a control signal to the dump truck 2 so that the dump truck 2 travels along the selected target travel track RP.

In the embodiment, the travel track selecting unit 125 selects the target travel track RP along which the dump truck 2 travels so that the dump truck 2 travels along the first target travel track RP and then travels along the second target travel track RP in the loading place LPA.

For example, the travel track selecting unit 125 selects the target travel track RP along which the plurality of dump trucks 2 travel so that a certain dump truck 2 travels along the target travel track RP1, reaches the loading point LP1, and completes a loading operation and then a next dump truck 2 travels along the target travel track RP2 and reaches the loading point LP2.

The travel track selecting unit 125 selects the target travel track RP so that the dump truck 2 sequentially travels through the plurality of loading points LP (LP1, LP2, and LP3). For example, the plurality of dump trucks 2 are controlled so that a first operation of causing a first dump truck 2 to travel along the target travel track RP1 to the loading point LP1 through the switchback point BP to perform a loading operation, a second operation of causing a second dump truck 2 to travel along the target travel track RP2 to the loading point LP2 through the switchback point BP to perform a loading operation, and a third operation of causing the third dump truck 2 to travel along the target travel track RP3 to the loading point LP3 through the switchback point BP to perform a loading operation are performed in such a manner that the first operation, the second operation, and the third operation are performed sequentially and the first operation, the second operation, and the third operation are performed sequentially again.

In the embodiment, the work point setting unit 122 sets the plurality of loading points LP (LP1, LP2, and LP3) so that the generation of a rut in the loading place LPA is suppressed. The travel track generating unit 123 sets the plurality of target travel tracks RP (RP1, RP2, and RP3) so that the generation of a rut in the loading place LPA is suppressed. The travel track selecting unit 125 selects the target travel track RP through which the dump truck 2 passes so that the generation of a rut in the loading place LPA is suppressed. The travel track control unit 126 sends a control signal to each of the dump trucks 2 so that the dump trucks travel along the selected target travel track RP.

For example, when a gap between the plurality of loading points LP is narrow or a gap between the plurality of target travel tracks RP is narrow, the vehicle wheels 26 of the plurality of dump trucks 2 substantially pass through the same route. As a result, there is a possibility that a deep rut is generated. The work point setting unit 122 sets the plurality of work points LP so that the gap between the plurality of work points LP becomes larger than, for example, the width (tire width) of the vehicle wheel 26. The travel track generating unit 123 sets the plurality of target travel tracks RP so that the gap between the plurality of target travel tracks RP becomes larger than, for example, the width (tire width) of the vehicle wheel 26.

Further, when a plurality of dump trucks 2 continuously travel toward a specific loading point LP among the plurality of loading points LP even when the plurality of loading points LP are set, there is a possibility that a deep rut is generated. Similarly, when the vehicle wheels 26 of the plurality of dump trucks 2 continuously pass through a specific target travel track RP among the plurality of target travel tracks RP even when the plurality of target travel tracks RP are set, there is a possibility that a deep rut is generated.

Here, the travel track selecting unit 125 selects a target travel track RP along which the dump truck 2 travels from the plurality of target travel tracks RP so that the plurality of dump trucks 2 do not continuously travel toward the same loading point LP of the plurality of loading points LP. For example, when a first dump truck 2 enters the loading place LP and then a second dump truck 2 enters the loading place LP, the travel track selecting unit 125 may select the target travel track RP so that the second dump truck 2 is not disposed at a first loading point LP in which the first dump truck 2 is disposed and is disposed at a second loading point LP different from the first loading point LP.

Further, the travel track selecting unit 125 selects the target travel track RP along which the dump truck 2 travels from the plurality of target travel tracks RP so that the plurality of dump trucks 2 do not continuously pass through the same target travel track RP of the plurality of target travel tracks RP between the switchback point BP and the plurality of loading points LP. For example, when a first dump truck 2 enters the loading place LP and then a second dump truck 2 enters the loading place LP, the travel track selecting unit 125 may select the target travel track RP so that the second dump truck 2 does not pass through a first target travel track RP through which the first dump truck 2 passes and passes through a second target travel track RP different from the first target travel track RP.

Additionally, even when the first loading point LP1 is selected as the loading point LP through which the first dump truck 2 passes in a certain loading place LPA, a different loading point LP may be selected when the first dump truck 2 subsequently enters the same loading place LPA.

As described above, according to the embodiment, since the plurality of loading points LP are set in one switchback point BP, the plurality of target travel tracks RP are generated so as to connect the switchback point BP to each of the plurality of loading points LP, and the dump truck 2 is controlled so that the dump truck travels to the loading point LP along each of the plurality of target travel tracks RP, it is possible to suppress the dump truck 2 from continuously traveling along the same target travel track RP. Thus, the generation of a deep rut in the loading place LP is suppressed. Since the generation of the deep rut is suppressed, a ground leveling work is suppressed and hence deterioration in productivity of the mine is suppressed.

Further, in the embodiment, the work point setting unit 122 sets the plurality of loading points LP so that the generation of a rut in the loading place LP is suppressed. Since the work point setting unit 122 adjusts the gap between the plurality of loading points LP or changes the position of the loading point LP, the generation of a deep rut is suppressed.

Further, in the embodiment, instruction data is generated by the operation of the input device 66 provided in the excavator 3 through the operator Ma and the work point setting unit 122 acquires the instruction data from the excavator 3 through the data acquiring unit 124. The work point setting unit 122 automatically sets more loading points LP than the number of times in which the operator Ma operates the input device 66. Accordingly, an operation of setting the plurality of loading points LP is highly efficiently performed. Further, the loading point LP can be set to a position desired by the operator Ma.

Further, in the embodiment, the dump truck 2 is controlled so that the dump truck sequentially travels through the plurality of loading points LP. Accordingly, for example, a period in which the dump truck 2 is disposed at the loading point LP1 and is disposed at the loading point LP1 again, a period in which the dump truck 2 is disposed at the loading point LP2 and is disposed at the loading point LP2 again, and a period in which the dump truck 2 is disposed at the loading point LP3 and is disposed at the loading point LP3 again can be set to be substantially equal to one another. Accordingly, since a deviation in the number of times of disposing the dump truck 2 at the plurality of loading points LP and a deviation in period in which the dump truck is not disposed are suppressed, the generation of a deep rut is suppressed.

Additionally, in the embodiment, the travel control unit 126 outputs a control signal so that the dump truck 2 sequentially passes through the plurality of loading points LP (LP1, LP2, and LP3). That is, a sequential traveling control of controlling the plurality of dump trucks 2 is performed so that the first operation of causing the first dump truck 2 to travel along the target travel track RP1 toward the loading point LP1 through the switchback point BP, the second operation of causing the second dump truck 2 to travel along the target travel track RP2 toward the loading point LP2 through the switchback point BP, and the third operation of causing the third dump truck 2 to travel along the target travel track RP3 toward the loading point LP3 through the switchback point BP are performed in such a manner that the first operation, the second operation, and the third operation are performed sequentially and the first operation, the second operation, and the third operation are performed sequentially again. A random traveling control may be performed so that the first operation, the second operation, and the third operation are changed whenever the dump truck 2 travels. With regard to the random control, as described above, the traveling of the dump truck 2 may be controlled so that the dump truck 2 does not continuously pass through the same switchback point BP. Further, the traveling may be controlled by a frequency map to be described below.

Second Embodiment

A second embodiment will be described. The same reference signs will be given to the same or equivalent components of the above-described embodiment and the description will be simplified or omitted.

Figure 11:
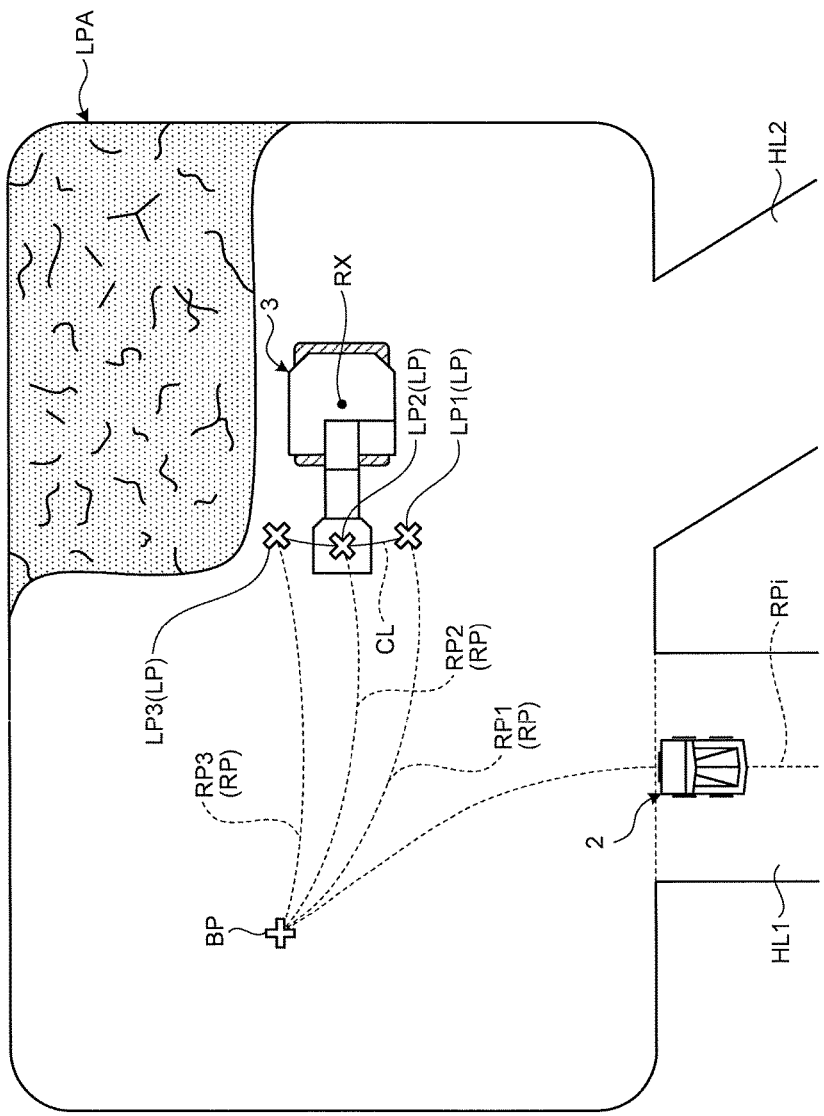
FIG. 11 is a schematic diagram illustrating an example of a dump truck control method according to a second embodiment.

FIG. 11 is a schematic diagram illustrating an example of a method of controlling the dump truck 2 according to the embodiment. As illustrated in FIG. 11, the work point setting unit 122 can set the plurality of loading points LP at intervals along a specific line CL in the loading place LPA. In the example illustrated in FIG. 11, three loading points LP (LP1, LP2, and LP3) are set along the specific line CL.

In the embodiment, the specific line CL is defined by a circular-arc line depicted by the bucket 53 when the traveling of the lower travel body 62 is substantially stopped and the upper swing body 61 swings about the swing axis RX. Further, the shape of the specific line may be a circular-arc shape or a linear shape.

As described above, the loading point LP is designated by, for example, the operator Ma of the excavator 3. The operator Ma operates the input device 66 while the bucket 53 is disposed at a desired position. The instruction data generating unit 74 of the excavator 3 generates instruction data of instructing the setting of the loading point LP of the dump truck 2 based on the bucket position data representing the absolute position of the bucket 53 at a time point in which the input data generated by the operation of the input device 66 is acquired by the input data acquiring unit 73.

In the embodiment, the operator Ma operates the input device 66 after the bucket 53 is disposed at the loading point LP1 by the operation of the operation lever 65 and then operates the input device 66 after the bucket 53 is disposed at the loading point LP3 by the operation of the operation lever 65. Accordingly, the instruction data generating unit 74 of the excavator 3 generates instruction data of instructing the setting of the loading point LP1 and instruction data of instructing the setting of the loading point LP3.

In the embodiment, the operator Ma stops the traveling of the lower travel body 62 after operating the input device 66 while the bucket 53 is disposed at the loading point LP1 and then operates the input device 66 after the bucket 53 is disposed at the loading point LP3 by the swing of the upper swing body 61 while the telescopic movement of the working implement 50 is stopped. Thus, the loading point LP1 and the loading point LP3 are set at intervals along the circular-arc specific line CL about the swing axis RX.

Additionally, the operator Ma may operate the input device 66 by disposing the bucket 53 at the loading point LP3 through the swing of the upper swing body 61 while the lower travel body 62 is made to slightly travel or the working implement 50 is made to slightly move in a telescopic manner after the input device 66 is operated while the bucket 53 is disposed at the loading point LP1.

The data acquiring unit 124 of the management apparatus 10 acquires the instruction data generated by the instruction data generating unit 74 from the excavator 3 through the communication system 9. The work point setting unit 122 of the management apparatus 10 sets the plurality of loading points LP based on the instruction data acquired by the data acquiring unit 124. As illustrated in FIG. 11, the work point setting unit 122 sets the loading point LP2 between the loading point LP1 and the loading point LP3 specified by the instruction data. The loading point LP2 is set on the specific line CL. That is, in the embodiment, the work point setting unit 122 sets three loading points LP1, LP2, and LP3 at intervals along the specific line CL.

As described above, since the specific line CL is set and the plurality of loading points LP are set along the specific line CL, the generation of a rut in the loading place LPA is suppressed and hence deterioration in productivity of the mine is suppressed.

Further, in the embodiment, the plurality of loading points LP are set at intervals along the circular-arc specific line CL about the swing axis RX. Accordingly, when the plurality of loading points LP are set, the operator Ma can smoothly set the plurality of loading points LP just by swinging the upper swing body 61 without causing the lower travel body 62 to travel and moving the working implement 50 in a telescopic manner. Further, since the plurality of work points LP are set along the specific line CL, the loading operation for the dump truck 2 disposed at each of the plurality of loading points LP can be performed with good workability only by the operation in which the operator Ma swings the upper swing body 61 without causing the lower travel body 62 to travel when the loading operation for the dump truck 2 is performed.

Additionally, in the embodiment, the specific line CL may not be the movement path of the bucket 53. For example, the management apparatus 10 may arbitrarily set the specific line CL.

Additionally, in the example illustrated in FIG. 11, three loading points LP (LP1, LP2, and LP3) are set along the specific line CL, but the loading point LP can be set to any position on the specific line CL. Whenever each dump truck 2 travels, the loading point LP at a certain position through which the dump truck passes is selected by the travel track selecting unit 125. As a specific travel track selecting method, for example, several predetermined loading points may be set and selected sequentially as in FIG. 11, the loading point LP may be selected while being moved upward by the same interval from the loading point LP1 of FIG. 11, or the loading point LP may be selected in random on the specific line CL. Further, the loading point LP may be selected by using a frequency map to be described later. In addition, any selection method can be employed.

Third Embodiment

A third embodiment will be described. The same reference signs will be given to the same or equivalent components of the above-described embodiment and the description will be simplified or omitted.

Figure 12:
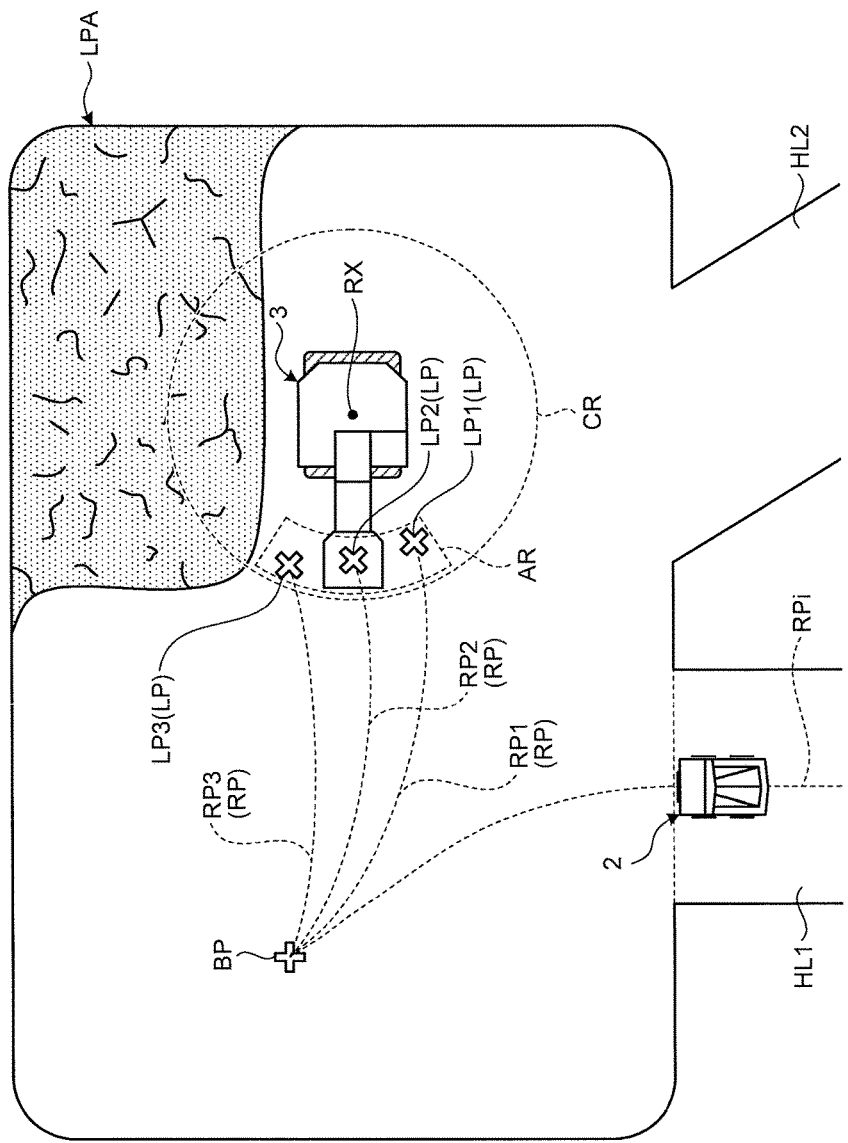
FIG. 12 is a schematic diagram illustrating an example of a dump truck control method according to a third embodiment.

FIG. 12 is a schematic diagram illustrating an example of a method of controlling the dump truck 2 according to the embodiment. As illustrated in FIG. 12, the work point setting unit 122 can set the plurality of loading points LP in the specific area AR set in the loading place LPA. In the example illustrated in FIG. 12, three loading points LP (LP1, LP2, and LP3) are set at intervals in the specific area AR.

In the embodiment, the specific area AR is set in the swing area CR of the upper swing body 61 of the excavator 3. The swing area CR of the upper swing body 61 indicates an inner area of a circle depicted by the blade edge of the bucket 53 when the traveling of the lower travel body 62 is substantially stopped and the upper swing body 61 swings about the swing axis RX while the working implement 50 is stretched most. Further, a state where the working implement 50 is stretched most indicates the posture of the working implement 50 when the blade edge of the bucket 53 is disposed at a position farthest from the swing axis RX within a plane substantially parallel to a ground surface on which the lower travel body 62 is disposed.

As described above, since the specific area AR is set and the plurality of loading points LP are set in the specific area AR, the generation of a rut in the loading place LPA is suppressed and hence deterioration in productivity of the mine is suppressed.

Further, in the embodiment, the specific area AR is specified in the swing area CR of the upper swing body 61 and the plurality of work points LP are set at intervals in the swing area CR of the upper swing body 61. Since the plurality of work points LP are set inside the swing area CR, the plurality of loading points LP can be smoothly set only by the operation in which the operator Ma swings the upper swing body 61 without causing the lower travel body 62 travel when the plurality of loading points LP are set. Further, since the plurality of work points LP are set inside the swing area CR, the loading operation for the dump truck 2 disposed at each of the plurality of loading points LP can be performed with good workability only by the operation in which the operator Ma swings the upper swing body 61 without causing the lower travel body 62 to travel when the loading operation for the dump truck 2 is performed.

Additionally, in the embodiment, the specific area AR may be set outside the swing area CR.

Additionally, in the example illustrated in FIG. 12, three loading points LP (LP1, LP2, and LP3) are set at intervals in the specific area AR, but the loading point LP can be set to any position on the specific area AR. Whenever each dump truck 2 travels, the loading point LP at a certain position through which the dump truck passes is selected by the travel track selecting unit 125. As a specific travel track selecting method, for example, several predetermined loading points may be set and selected sequentially as in FIG. 12, the loading point LP may be selected while being moved by the same interval from the loading point LP1 of FIG. 12 in a predetermined direction (up, down, left/right, or obliquely), or the loading point LP may be selected in random on the specific area AR. Further, the loading point LP may be selected by using a frequency map to be described later. In addition, any selection method can be employed.

Fourth Embodiment

A fourth embodiment will be described. The same reference signs will be given to the same or equivalent components of the above-described embodiment and the description will be simplified or omitted.

In the embodiment, a method of selecting the switchback point BP, that is, the travel track RP using the frequency map will be described. The method using the frequency map can be applied to, for example, the examples of the first to third embodiments. In the embodiment, the travel track selecting unit 125 changes the position of the loading point LP so that the generation of a rut in the loading place LPA is suppressed. The travel track generating unit 123 changes the position (route) of the target travel track RP so that the generation of a rut in the loading place LPA is suppressed.

Figure 13:
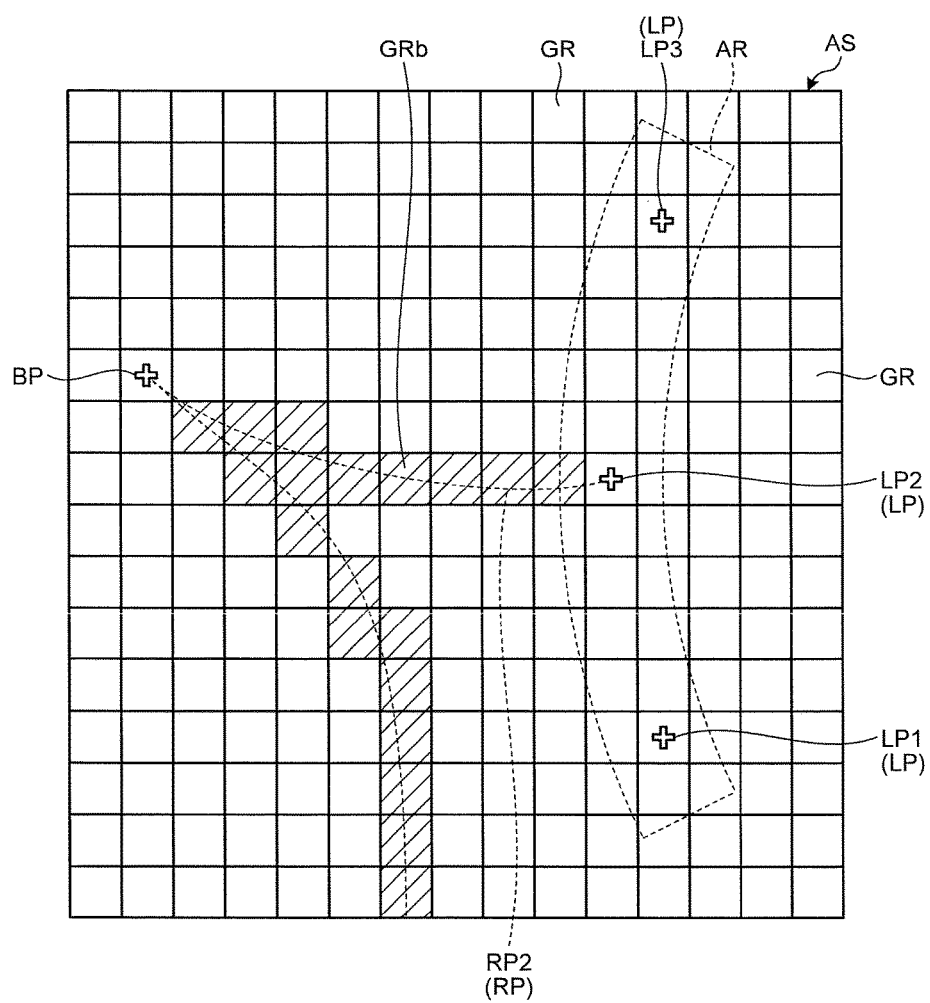
FIG. 13 is a schematic diagram illustrating an example of a dump truck control method according to a fourth embodiment.

FIG. 13 is a schematic diagram illustrating an example of a method of controlling the dump truck 2 according to the embodiment. In FIG. 13, an example of using the specific area AR of the above-described third embodiment will be described. The travel control unit 126 defines a predetermined area AS of the loading place LPA including the switchback point BP and the plurality of loading points LP by a plurality of grids GR. The specific area AR is set as a part of the predetermined area AS. The travel control unit 126 specifies the grid GR through which the vehicle wheel 26 of the dump truck 2 passes based on the absolute position data of the dump truck 2 detected by the position detector 35.

The travel control unit 126 counts the number of times in which the vehicle wheel 26 of the dump truck 2 passes through the grid in each of the plurality of grids GR. That is, when the number of times of counting the passage in a certain grid GR is largely different from the number of times of counting the passage in the peripheral grid GR, it is thought that a rut is generated in that area. The work point setting unit 122 automatically changes the position of the loading point LP so that the number of times in which the vehicle wheel 26 of the dump truck 2 passes through the grid GR does not become larger than the number of times in which the vehicle wheel passes through the peripheral grid GR in each of the plurality of grids GR set in the predetermined area AS while the position of the switchback point BP is fixed. Further, the travel track generating unit 123 changes the route of the target travel track RP so that the number of times in which the vehicle wheel 26 of the dump truck 2 passes through the grid GR does not become larger than the number of times in which the vehicle wheel passes through the peripheral grid GR in each of the plurality of grids GR set in the predetermined area AS while the position of the switchback point BP is fixed. Accordingly, the generation of a deep rut is suppressed.

In the example illustrated in FIG. 13, it is determined that the number of times in which the vehicle wheel 26 of the dump truck 2 passes through the grid GRb including the target travel track RP2 and the loading point LP2 is larger than the number of times in which the vehicle wheel passes through the peripheral grid GR of the grid GRb. In this case, the work point setting unit 122 changes the position of the work point LP from the work point LP2 to, for example, the work point LP1 or the work point LP3 in the specific area AR.

Additionally, in the embodiment, a case has been described in which the number of times of counting the grid located on the target travel track RP increases, but the number of times of counting the grid located on the tire travel track of the actual travel track may be increased.

As described above, in the embodiment, the frequency map representing the frequency of the passage of the vehicle wheel 26 of the dump truck 2 in the predetermined area AS of the loading place LPA is created and the work point LP and the target travel track RP are set so that the vehicle wheel 26 does not travel highly frequently only in the specific area of the predetermined area AS with reference to the frequency map. Thus, the generation of a rut in the loading place LPA is suppressed and hence deterioration in productivity of the mine is suppressed.

Fifth Embodiment

A fifth embodiment will be described. The same reference signs will be given to the same or equivalent components of the above-described embodiment and the description will be simplified or omitted.

Figure 14:
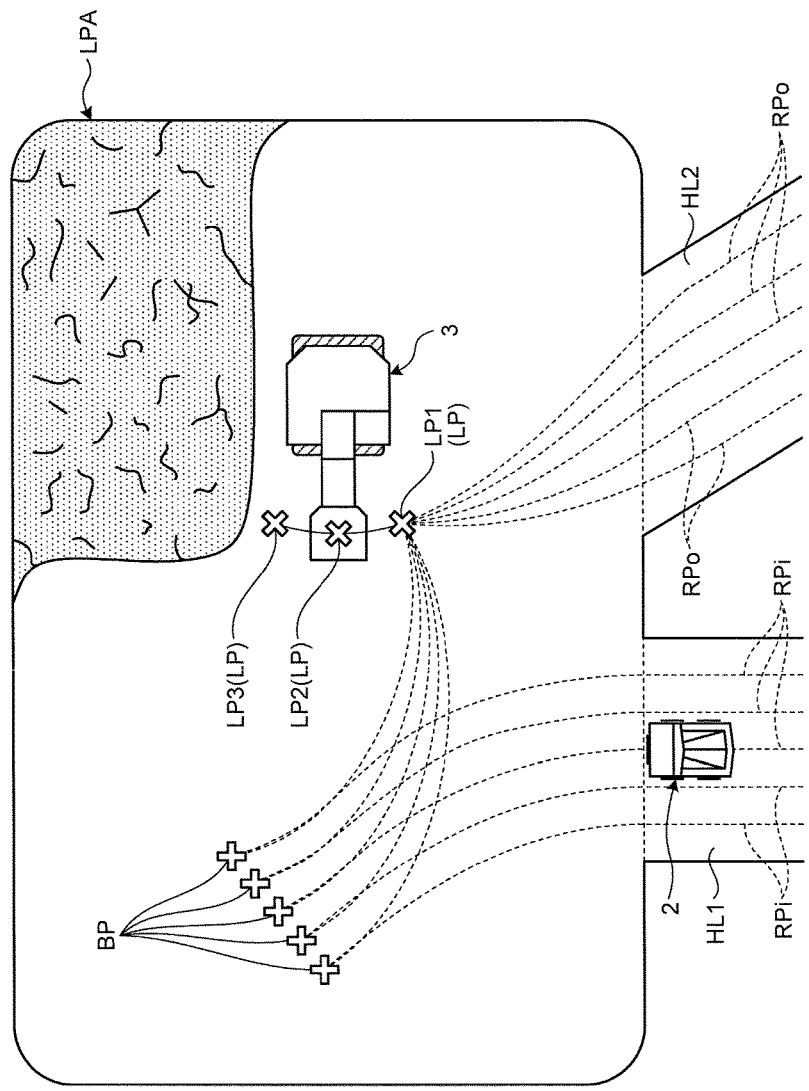
FIG. 14 is a schematic diagram illustrating an example of a dump truck control method according to a fifth embodiment.

FIG. 14 is a schematic diagram illustrating an example of a method of controlling the dump truck 2 according to the embodiment. As illustrated in FIG. 14, the switchback point setting unit 121 can generate the plurality of switchback points BP in the loading place LPA. Further, the travel track generating unit 123 can generate the plurality of target travel tracks RPi in the first transportation track HL1. In the example illustrated in FIG. 14, five switchback points BP are set at intervals in the loading place LPA and five target travel tracks RPi are generated in the first transportation track HL1. The travel control unit 126 controls the dump truck 2 so that the dump truck 2 passes through each of the plurality of target travel tracks RPi in the first transportation track HL1. Accordingly, the generation of a deep rut in the first transportation track HL1 is suppressed.

In the embodiment, the travel track generating unit 123 generates the plurality of target travel tracks RPi in the first transportation track HL1 so that the plurality of switchback points BP are respectively connected to the plurality of target travel tracks RPi of the first transportation track HL1.

Further, the travel track generating unit 123 generates the plurality of target travel tracks RP in the loading place LPA so that the loading point LP is connected to each of the plurality of switchback points BP. Additionally, FIG. 14 illustrates an example in which the loading point LP1 is connected to each of the plurality of switchback points BP. Although not illustrated in the drawings, the travel track generating unit 123 generates the plurality of target travel tracks RP in the loading place LPA so that the loading point LP2 is connected to each of the plurality of switchback points BP. Further, the travel track generating unit 123 generates the plurality of target travel tracks RP in the loading place LPA so that the loading point LP3 is connected to each of the plurality of switchback points BP. The travel control unit 126 controls the dump truck 2 so that the dump truck 2 passes through each of the plurality of target travel tracks RP in the loading place LPA. Accordingly, the generation of a deep rut in the loading place LPA is suppressed.

Further, the travel track generating unit 123 can generate the plurality of target travel tracks RPo of the dump truck 2 in the second transportation track HL2. The travel track generating unit 123 generates the plurality of target travel tracks RPo in the second transportation track HL2 so that the loading point LP is connected to each of the plurality of target travel tracks RPo of the second transportation track HL2. Additionally, FIG. 14 illustrates an example in which the loading point LP1 is connected to each of the plurality of target travel tracks RPo. Although not illustrated in the drawings, the travel track generating unit 123 generates the plurality of target travel tracks RPo in the second transportation track HL2 so that the loading point LP2 is connected to each of the plurality of target travel tracks RPo. Further, the travel track generating unit 123 generates the plurality of target travel tracks RPo in the second transportation track HL2 so that the loading point LP3 is connected to each of the plurality of target travel tracks RPo. The travel control unit 126 controls the dump truck 2 so that the dump truck 2 passes through each of the plurality of target travel tracks RPo in the second transportation track HL2. Accordingly, the generation of a deep rut in the second transportation track HL2 is suppressed.

As described above, according to the embodiment, since the plurality of target travel tracks RPi are generated in the first transportation track HL1 and the plurality of target travel tracks RPo are generated in the second transportation track HL2, the generation of a rut even in the first transportation track HL1 and the second transportation track HL2 is suppressed. Further, since the plurality of switchback points BP are set, the generation of a rut in a wide range of the loading place LPA is suppressed.

Sixth Embodiment

A sixth embodiment will be described. The same reference signs will be given to the same or equivalent components of the above-described embodiment and the description will be simplified or omitted.

Figure 15:
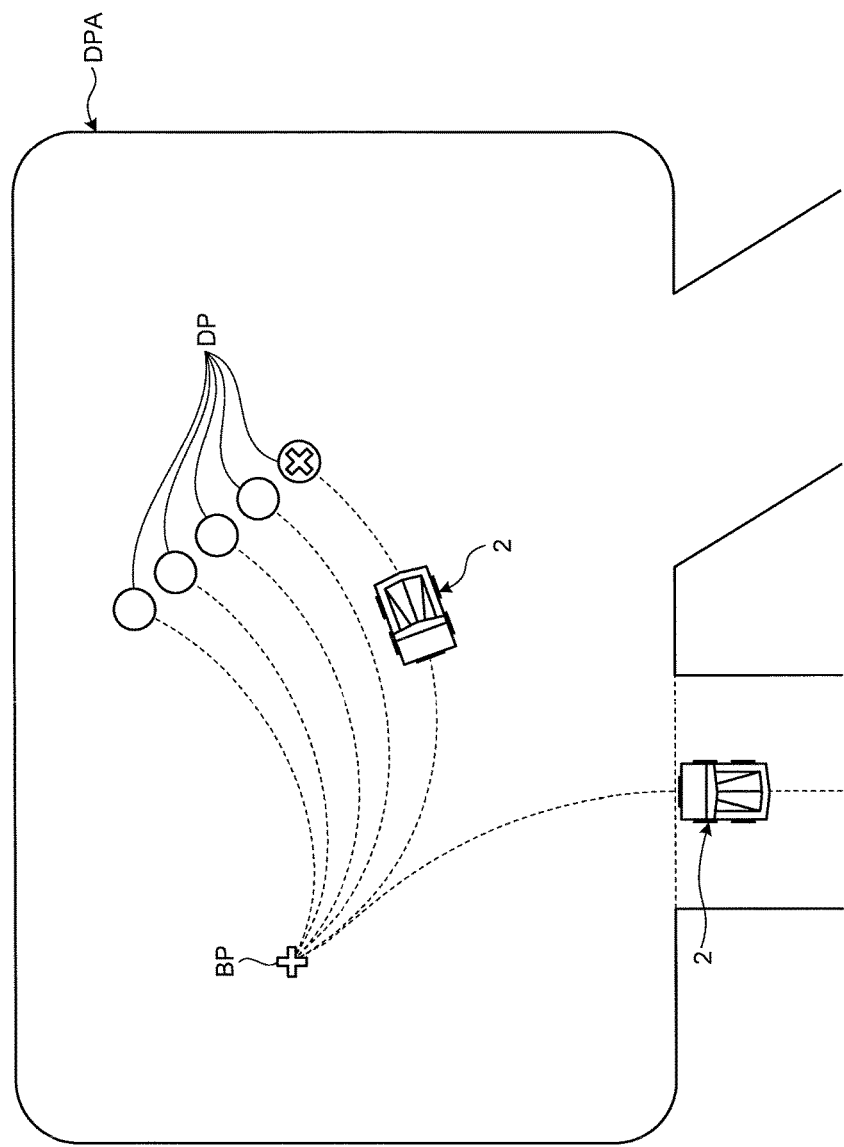
FIG. 15 is a schematic diagram illustrating an example of a dump truck control method according to a sixth embodiment.

FIG. 15 is a schematic diagram illustrating an example of a method of controlling the dump truck 2 according to the embodiment. As illustrated in FIG. 15, the work point setting unit 122 can set the plurality of discharging points DP of the dump truck 2 in the soil removing place DPA. Further, the switchback point setting unit 121 can set the switchback point BP in the soil removing place DPA. The travel track generating unit 123 can generate the plurality of target travel tracks RP connecting the switchback point BP to each of the discharging points DP.

As described above, according to the embodiment, the generation of a rut in the soil removing place DPA is suppressed.

Additionally, in the above-described embodiments, a case has been described in which the setting of the work point including one of or both the loading point LP and the discharging point DP is performed based on the operation of the input device 66 from the operator Ma. The work point may be automatically selected by the management apparatus 10. Further, the instruction data generated in the excavator 3 by the operation of the input device 66 through the operator Ma may be sent to the dump truck 2 through the vehicle-to-vehicle communication between the excavator 3 and the dump truck 2 without using the management apparatus 10.

Additionally, in the above-described embodiments, a case has been described in which the dump truck 2 is the unmanned dump truck. The dump truck 2 may be a manned dump truck which travels by the operation of the operator.

Additionally, in the above-described embodiments, a case has been described in which the control system 1 is applied to the traveling of the dump truck 2, but may be applied to, for example, the traveling of the other mining machine such as a wheel loader different from the dump truck 2.

Further, in the above-described embodiments, a case has been described in which the work machine is the mining machine operated in the mine, but the work machine may be used in a construction site different from the mine.

REFERENCE SIGNS LIST

1 CONTROL SYSTEM
2 DUMP TRUCK (MINING MACHINE)
3 EXCAVATOR (MINING MACHINE)
4 MINING MACHINE (WORK MACHINE)
5 POSITIONING SATELLITE
6 RELAY
7 CONTROL FACILITY
9 COMMUNICATION SYSTEM
10 MANAGEMENT APPARATUS
11 COMPUTER
12 PROCESSING DEVICE
13 STORAGE DEVICE
15 INPUT/OUTPUT UNIT
16 DISPLAY DEVICE
17 INPUT DEVICE
18 RADIO COMMUNICATION DEVICE
18A ANTENNA
21 TRAVELING DEVICE
22 VEHICLE BODY
23 VESSEL
24 DRIVING DEVICE
25 CONTROL DEVICE
26 VEHICLE WHEEL
27 AXLE
28 BRAKE DEVICE
29 STEERING DEVICE
35 POSITION DETECTOR
35A ANTENNA
36 RADIO COMMUNICATION DEVICE
36A ANTENNA
41 INPUT/OUTPUT UNIT
42 TRAVELING CONDITION DATA ACQUIRING UNIT
43 OPERATION CONTROL UNIT
44 ABSOLUTE POSITION DATA ACQUIRING UNIT
45 STORAGE UNIT
50 WORKING IMPLEMENT
53 BUCKET
57 DETECTING DEVICE
60 VEHICLE BODY
61 UPPER SWING BODY
62 LOWER TRAVEL BODY
62A DRIVE WHEEL
62B DRIVEN WHEEL
62C CRAWLER
63 CAB
64 DRIVER SEAT
65 OPERATION LEVER
66 INPUT DEVICE
67 DISPLAY DEVICE
68 POSITION DETECTOR
69 RADIO COMMUNICATION DEVICE
70 CONTROL DEVICE
71 INPUT/OUTPUT UNIT
72 BUCKET POSITION DATA ACQUIRING UNIT
73 INPUT DATA ACQUIRING UNIT
74 INSTRUCTION DATA GENERATING UNIT
121 SWITCHBACK POINT SETTING UNIT
122 WORK POINT SETTING UNIT
123 TRAVEL TRACK GENERATING UNIT
124 DATA ACQUIRING UNIT
125 TRAVEL TRACK SELECTING UNIT
126 TRAVEL CONTROL UNIT
AR SPECIFIC AREA
AS PREDETERMINED AREA
BP SWITCHBACK POINT
CL SPECIFIC LINE
CR SWING AREA
CS COURSE DATA
DPA SOIL REMOVING PLACE
GR GRID
HL TRANSPORTATION TRACK
LP LOADING POINT (WORK POINT)
LPA LOADING PLACE
PI COURSE POINT
PA WORK PLACE
RP TARGET TRAVEL TRACK

The invention claimed is:

1. A work machine management apparatus comprising:
a switchback point setting unit configured to set a switchback point of a transporting machine in a work place of a mine;
a work point setting unit configured to set a plurality of work points of the transporting machine in which a loading operation of loading a load onto the transporting machine is performed by a loading machine including an upper swing body and a lower travel body, in a portion of a swing area of the upper swing body which swings with the traveling of the lower travel body stopped, to the set switchback point in the work place;
a travel track generating unit configured to generate a plurality of target travel tracks along which the transporting machine can travel in the work place, based on a position of the set switchback point in the work place and a position of each of the set plurality of work points thereto; and a travel track selecting unit configured to select a target travel track along which the transporting machine travels in the work place, among the plurality of target travel tracks.

2. The work machine management apparatus according to claim 1, wherein the travel track selecting unit selects a first target travel track as a target travel track along which a first transporting machine travels in the work place and selects a second target travel track different from the first target travel track as a target travel track along which a second transporting machine subsequently entering the work place travels in the work place.

3. The work machine management apparatus according to claim 1, wherein the travel track selecting unit selects the work point so that the transporting machine sequentially passes through the plurality of work points.

4. The work machine management apparatus according to claim 1,
wherein the travel track selecting unit randomly selects at least one work point through which the transporting machine passes, among the plurality of work points.

5. The work machine management apparatus according to claim 1,
wherein the travel track selecting unit selects at least one work point through which the transporting machine passes by using a frequency map so that generation of a rut in the work place is suppressed, among the plurality of work points.

6. The work machine management apparatus according to claim 1, wherein the work point setting unit sets the plurality of work points at intervals within a specific area inside the work place.

7. The work machine management apparatus according to claim 6,
wherein the work point setting unit sets the plurality of work points so that each of the intervals between the plurality of work points becomes larger than wheel width of the transporting machine.

8. The work machine management apparatus according to claim 1, wherein the work point setting unit sets the plurality of work points at intervals along a specific line inside the work place.

9. The work machine management apparatus according to claim 8,
wherein the work point setting unit sets the plurality of work points so that each of the intervals between the plurality of work points becomes larger than wheel width of the transporting machine.

10. The work machine management apparatus according to claim 1,
wherein the switchback point setting unit sets a plurality of switchback points of the transporting machine in the work place, and
the plurality of work points are respectively connected to the plurality of switchback points.

11. The work machine management apparatus according to claim 10,
wherein the travel track generating unit generates the plurality of target travel tracks of the transporting machine in a transportation track which is connected to the work place and along which the transporting machine entering the work place travels, and
the plurality of target travel tracks in the transportation track are respectively connected to the plurality of switchback points in the work place.

12. The work machine management apparatus according to claim 11,
wherein the travel track generating unit generates a plurality of the target travel tracks in the transportation track, and
the plurality of switchback points are respectively connected to the plurality of target travel tracks in the transportation track.

13. The work machine management apparatus according to claim 1,
wherein the travel track generating unit generates a plurality of target travel tracks of the transporting machine in a transportation track which is connected to the work place and along which the transporting machine leaving the work place travels, and
at least one work point is connected to each of the plurality of target travel tracks in the transportation track.

14. The work machine management apparatus according to claim 13,
wherein the travel track generating unit respectively connects the plurality of work points to the plurality of target travel tracks in the transportation track.

15. A work machine management apparatus comprising:
a work point setting unit configured to set a plurality of soil removing points of a transporting machine in a soil removing place of a mine;
a switchback point setting unit configured to set a switchback point of the transporting machine in the soil removing place of the mine; and
a travel track generating unit configured to generate a plurality of target travel tracks connecting the set switchback point with the set plurality of soil removing points respectively.

16. A work machine management method comprising:
setting a switchback point of a transporting machine in a work place of a mine;
setting a plurality of work points of the transporting machine in which a loading operation of loading a load onto the transporting machine is performed by a loading machine including an upper swing body and a lower travel body, in a portion of a swing area of the upper swing body which swings with the traveling of the lower travel body stopped, to the set switchback point in the work place;
generating a plurality of target travel tracks along which the transporting machine can travel in the work place, based on a position of the set switchback point in the work place and a position of each of the set plurality of work points thereto; and
selecting a target travel track along which the transporting machine travels in the work place, among the plurality of target travel tracks.

17. A work machine management method comprising:
setting a plurality of soil removing points of a transporting machine in a soil removing place of a mine;
setting a switchback point of the transporting machine in the soil removing place of the mine; and
generating a plurality of target travel tracks connecting the set switchback point with the set plurality of soil removing points respectively.

* * * * *